United States Patent [19]

Kogure et al.

[11] 4,181,276
[45] Jan. 1, 1980

[54] SAFETY DEVICE IN AIRCRAFT HIGH-LIFT DEVICE

[75] Inventors: Yasuyuki Kogure; Yoneo Okada, both of Utsunomiya, Japan

[73] Assignee: Fuji Jukogyo Kabushiki Kaisha, Tokyo, Japan

[21] Appl. No.: 913,027

[22] Filed: Jun. 6, 1978

[30] Foreign Application Priority Data

Aug. 10, 1977 [JP] Japan .................................. 52/95721

[51] Int. Cl.² ............................................. B64C 9/00
[52] U.S. Cl. .................................. 244/215; 244/76 R
[58] Field of Search ................ 244/75 R, 76 R, 83 R, 244/203, 213, 215

[56] References Cited

U.S. PATENT DOCUMENTS

| 2,332,516 | 10/1943 | Kemmer | 244/75 R |
| 3,935,754 | 2/1976 | Comollo | 244/213 |

Primary Examiner—Charles E. Frankfort
Attorney, Agent, or Firm—Martin A. Farber

[57] ABSTRACT

A pulley-and-cable mechanism including a swivel frame symmetrically intercouples the starboard and port flaps of an aircraft and substantially synchronizes their movements irrespective of asymmetrical forces thereon, but an asymmetrical force on or asymmetrical operation of the flaps causes the swivel frame to undergo a displacement which activates a microswitch thereby to stop the flap driving motor and to send out an alarm which can be sensed by the pilot in the cockpit.

7 Claims, 5 Drawing Figures

SAFETY DEVICE IN AIRCRAFT HIGH-LIFT DEVICE

BACKGROUND OF THE INVENTION

This invention relates generally to high-lift devices of aircraft and more particularly to a safety device which operates to detect any tendency toward an asymmetrical condition between the starboard and port parts of a high-lift device of an aircraft and then promptly operates to prevent further development of such a condition and to send an alarm to the pilot.

As is known, high-lift devices of aircraft are used during take-off and landing thereof to increase the lift coefficient of the wings, the most common high-lift device being flaps. In the case of an asymmetrical condition between the starboard and port flaps of an aircraft due to trouble or failure in the flap operating mechanism, a great imbalance between the lift forces on the starboard and port wings occurs. Depending on the degree of this asymmetry, the imbalance may be of such a magnitude that it cannot be compensated for by the aircraft control surfaces, whereby the aircraft is an unsafe state.

SUMMARY OF THE INVENTION

It is an object of this invention to provide, in a high-lift device of an aircraft, a relatively simple and inexpensive safety device which operates to detect promptly any trouble or failure in the high-lift device and simultaneously to prevent further development of asymmetry between the starboard and port parts of the high-lift device.

Another object of this invention is to provide a safety device of the above stated character which requires very little space and can be completely installed within the main wings of the aircraft without necessitating any changes in the design or construction of the aircraft airframe.

Still another object of the invention is to provide a safety device of the above stated character which can be adapted for installation in the operating mechanism of an existing high-lift device of an aircraft.

According to this invention, briefly summrized, there is provided, in a high-lift device provided in an aircraft with a main wing and comprising movable starboard and port high-lift surfaces installed with respect to the main wing and driving means for operating the high-lift surfaces synchronously, a safety device comprising: a swivel frame pivotally supported at its midpoint by a fixed pivot pin on the aircraft at a position between the high-lift surfaces; a pair of tandem inboard wheel means rotatably supported by respective parallel support shafts on the swivel frame at spacedapart positions on opposite sides of the fixed pivot pin; outboard wheels rotatably supported in the wing on opposite sides of the aircraft near the high-lift surfaces, movement transmitting means being provided to transmit movements of each high-lift device to the corresponding outboard wheel thereby to impart rotation to this wheel according to the degree of movement of the high-lift surface; an endless flexible connector stretched around the outboard wheels and the inboard wheel means in a figure-eight path, being crossed in the region between the two pairs of inboard wheel means; and sensing means activated by a swiveling displacement of the swivel frame for sensing an asymmetrical state of the high-lift device.

In this safety device, the swivel frame, the inboard and outboard wheels, the movement transmitting means, and the flexible connector constitute an intercoupling mechanism which operates to mechanically intercouple the high-lift surfaces and to synchronize the movements thereof and normally operates in a state of equilibrium wherein the swivel frame is in equilibrium free of any moment urging it to swivel when the high-lift device is operating in a symmetrical state, but which continues to intercouple the high-lift devices but under an unbalanced state wherein the swivel frame is biased to undergo a swiveling displacement when the high-lift device operates in an asymmetrical state, which displacement activates the sensing means as described above.

The nature, utility, and further features of this invention will be more clearly apparent from the following detailed description with respect to a preferred embodiment of the invention when read in conjunction with the accompanying drawings, in which like parts are designated by like reference numerals and characters.

DETAILED DESCRIPTION

As conducive to a full understanding of this invention, a general example of an aircraft high-lift device to which this invention can be effectively applied will first be briefly considered.

Figure 1:
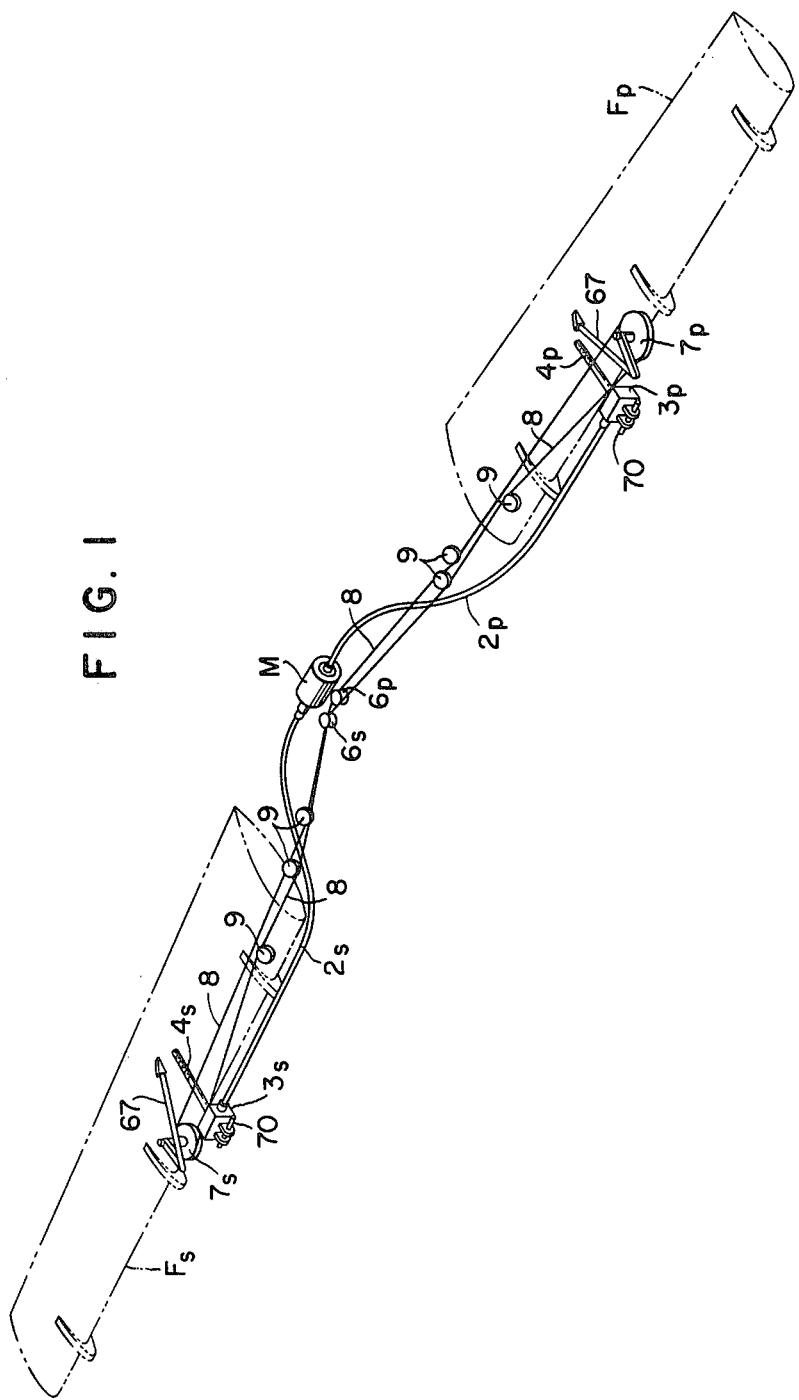
FIG. 1 is a schematic perspective view showing the general layout and construction of one example of an aircraft high-lift device according to this invention, parts of the aircraft other than this device being omitted.

In the high-lift device illustrated in FIG. 1, starboard and port flaps Fs and Fp are provided in the known manner at the trailing edge of the main wing (not shown) of a fixed-wing aircraft. These flaps Fs and Fp are operated by power from a motor M used as a motive power means at the middle part of the wing. The rotor shaft of the motor M extends outward at its two ends, which are coupled to the inboard ends of starboard and port flexible cable shafts 2s and 2p coupled at their outboard ends in the known manner to flap actuators 3s and 3p. Each flap actuator 3s or 3p, as described hereinafter, has therein a worm and worm wheel, by which speed reduction of the transmitted rotation is carried out, and has an output shaft coupled to a screw-threaded shaft 4s or 4p. Rotation of each screw shaft 4s or 4p causes its corresponding flap to undergo displacement in the forward-and-aft and up-and-down directions as described more fully hereinafter.

If a breakage occurs in the cable shaft 2s or 2p on one side, for example, in the above described flap operating mechanism, the driving power of the motor will no longer be transmitted to the flap Fs or Fp on that side but will continue to be transmitted to the flap on the other side. As a consequence, an asymmetrical state will arise between the starboard and port flaps. In the case where a breakage occurs in a screw shaft 4s or 4p on one side, the flap on that side will lose its back-up means against the air force acting thereon and will therefore be forced abruptly into its raised position, whereby an imbalance of lift forces as described before will occur and give rise to a serious situation.

According to this invention, there is provided a high-lift device in which, an unbalanced state as decribed above is promptly detected by detection means as described hereinafter, and, in response to this detection, an alarm is transmitted to the pilot of the aircraft, while, simultaneously, the motor M is automatically stopped. In the case of failure such as breakage of the screw shaft 4s or 4p on one side, a movement transmitting cable intercoupling the two flaps as described hereinafter operates to transmit the load on one side to the other side thereby to prevent an increase in the asymmetry between the starboard and port sides.

Figure 2:
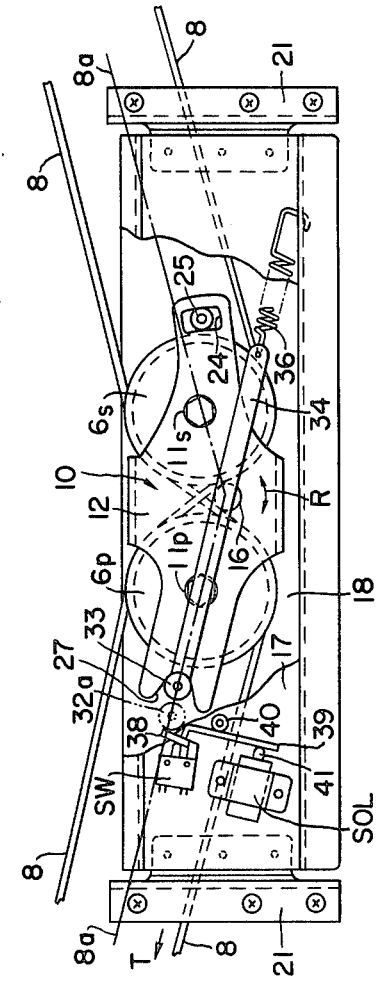
FIGS. 2 and 3 are respectively a top plan view and a rear elevation, with parts cut away and some parts shown in section, showing a mechanism positioned at the middle part of the high-lift device and including a swivel frame for supporting first rotation transmission members.
Figure 3:
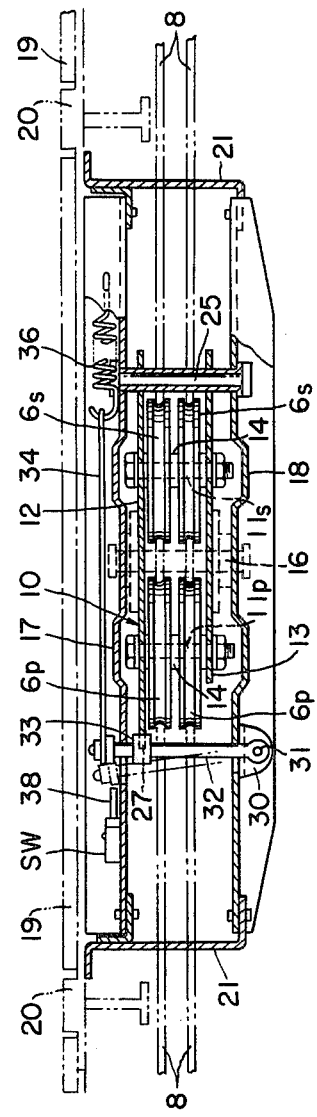

As shown in FIGS. 1, 2, and 3, two pairs of upper and lower rotation transmitting members 6s and 6p are provided in the vicinity of the motor M, that is, in a position midway between the two flaps Fs and Fp. In the illustrated embodiment of the invention, these members 6s and 6p are sheaves or pulleys, which will be hereinafter referred to as first sheaves. Other rotation transmitting members 7s and 7p are respectively provided in the starboard and port wings in the vicinity of their respective screw shafts 4s and 4p. These members 7s and 7p in the illustrated embodiment are sheaves, which will hereinafter be referred to as second sheaves.

Around and between these first and second sheaves 6s, 6p, 7s, and 7p, an endless rotation transmitting cable 8 is passed in a figure-eight path. This cable 8, which in the illustrated embodiment is a steel wire cable, is guided and tensioned in its spans between the first and second sheaves 6s and 7s and 6p and 7p by guiding and tensioning pulleys 9.

The details of the first sheaves and related parts are shown in FIGS. 2 and 3. It will be seen that the two parts of the cable 8 extending inboard from each second sheave (for example, the starboard second sheave 7s) at mutually different height levels as viewed in elevation are passed partly around respective sheaves of the pair of first sheaves (6s) on that side, mutually crossed in the space between the two pairs of first sheaves as viewed in plan view, and then passed partly around respective sheaves of the pair of first sheaves (6p) on the opposite side to extend outboard toward the other second sheave (7p). Since the two parts of the cable 8 are crossed at different levels in the space between the two pairs of first sheaves 6s and 6p, they are clear of each other.

By the above described arrangement of the cable 8 and first and second sheaves, any longitudinal movement of the cable 8 causes the two first sheaves at the same level (i.e., the upper first sheaves or lower first sheaves 6s and 6p) to rotate in opposite directions, causes the two sheaves in each pair of upper and lower first sheaves (6s or 6p) to rotate in the same direction, and causes the second sheaves 7s and 7p to rotate in mutually opposite directions.

The two pairs of first sheaves 6s and 6p are rotatably supported respectively on two spaced-apart vertical support shafts 11s and 11p fixed to a swivel frame 10. The swivel frame 10 is of integral construction and comprises spaced-apart upper and lower plates 12 and 13 joined at their front and rear parts. The upper and lower sheaves of each pair of first sheaves are spaced apart from each other by a spacer 14 interposed therebetween and are disposed between the upper and lower plates 12 and 13 of the swivel frame 10.

The swivel frame 10 is supported to swivel freely about a vertical fixed pivot shaft 16 fixed at its upper and lower ends respectively to upper and lower fixed frame plates 17 and 18 and positioned midway between the support shafts 11s and 11p and at the intersection of the center lines 8a of the pairs of opposing runs of the cables 8 to prevent occurence of any unbalance moment. The upper and lower fixed frame plates 17 and 18 are fixedly supported by brackets 21, 21 secured to a part of the airframe such as, for example, a frame structure 20 supporting floor panels 19.

As shown in FIG. 2, the upper plate 12 of the swivel frame 10 extends outward in the starboard and port directions to ends beyond the peripheries of the sheaves 6s and 6p. One end of this upper plate 12 is provided with a slot 24 of arcuate shape, the center of its arc being at the center of the fixed pivot shaft 16. A vertical guide shaft 25 is passed through this slot 24 and is fixed at its upper and lower ends to the upper and lower fixed frame plates 17 and 18. The guide shaft 25 functions to limit the range of swiveling displacement of the swivel frame 10 and, at the time of asymmetrical operation as described hereinafter, when a limit position thereof is reached, serves to stop at that position the swiveling rotation of the swivel frame 10 due to the load on rotation transmitting cable 8.

The other end of the upper plate 12 of the swivel frame 10 is formed in the shape of a forked cam 27. A cam follower 33 of roller type is normally engaged with the inner cam surface of this forked cam 27. The cam follower 33 is supported by a detection arm 32 at an intermediate part thereof. The detection arm 32, which is normally substantially vertical, is pivoted at its lower end by a pivot pin 31 secured to a bracket 30, which is fixed to the bottom surface of the lower fixed frame plate 18 as shown in FIG. 3. One end of a connecting bar 34 is pin connected to the upper end of the detection arm 32. The other end of the connecting bar 34 is connected to one end of a tension spring 36 anchored at its other end to the upper fixed frame plate 17. Thus, the cam follower 33 is urged by the force of the spring 36 toward and against the interior of the forked cam 27 of the swivel frame 10.

When the swivel frame 10 undergoes a swiveling rotation as described hereinafter, the forked cam 27 imparts a cam action on the cam follower 33 by which the detection arm 32 tilts, and its upper end moves toward the position 32a indicated by two-dot chain line. An actuator 38 of a microswitch SW for detection is positioned in the path of this movement of the upper end of the detection arm 32. One end of a lever 39 pivotally supported on a pivot pin 40 is contacting the actuator 38, and the other end of the lever 39 is contacting the outer end of the armature 41 of a solenoid SOL.

Figure 4:
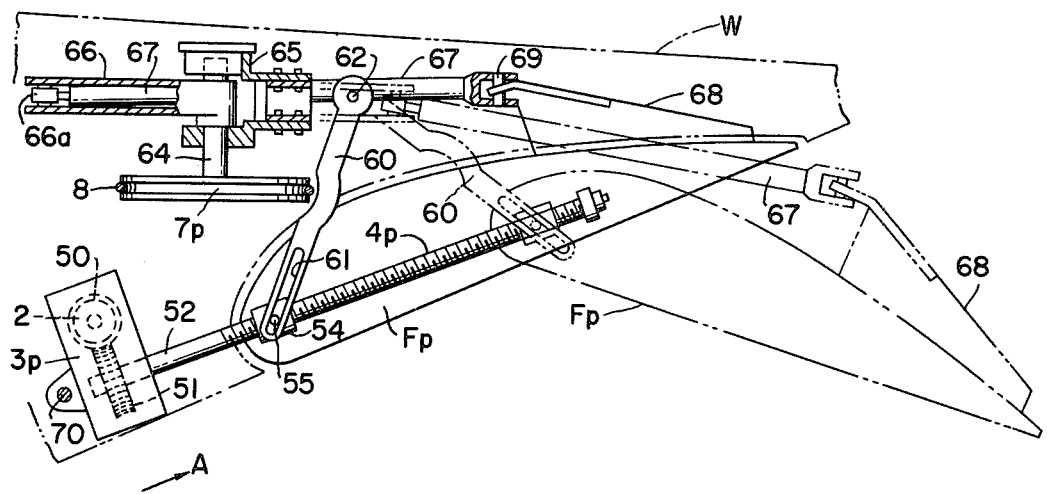
FIGS. 4 and 5 are respectively a port side elevation and a top plan view showing the mechanism supporting the port flap relative to the port wing and the relationship between the port second rotation transmission member and the port flap.

In the illustrated embodiment, each flap is of the so-called slotted type and is installed below the trailing edge part of the main wing W on its respective side as illustrated in FIG. 4, which shows the port flap Fp. The aforementioned flap actuator 3p is pivotally supported at a suitable positon on the wing W by a pivot pin 70 and has therewithin a worm 50 coupled to the outboard end of the aforementioned flexible cable shaft 2p and a worm wheel 51 meshed with the worm 50 and fixed to the forward end of an output shaft 52. The output shaft 52 is coupled to or formed integrally with the aforementioned screw shaft 4p. Thus, the rotation of the motor M is transmitted through the above described transmission mechanism to rotate the screw shaft 4p.

The screw shaft 4p is meshed with a nut 54 which is pivotally connected by a pivot pin 55 to the leading edge of the flap Fp. Accordingly, when the screw shaft 4p is thus rotated by the motor M in the flap extending or "down" direction, the nut 54 is moved rearward, whereby the leading edge of the flap Fp is moved rearward to a position as indicated by two-dot chain line. At the same time, the flap Fp is guided by conventional flap rails (not shown) to assume an operative state with lowered trailing edge and suitable flap deflection. On one hand, the above mentioned pin 55 is engagedly inserted through a slot 61 formed at the distal end of a swinging arm 60 pivotally connected at its proximal end to a pivot shaft 62 of a cam box (not shown) for detecting the flap position, which is provided in the wing structure.

The aforementioned second sheave 7p is fixed to a vertical shaft 64, which is rotatably supported by a bearing 65 mounted on the wing structure. An arm 66 is fixed at its proximal end to the shaft 64 and is connected at its distal end by a universal joint 66a to one end of a push-pull rod 67. The other end of the push-pull rod 67 is similarly connected by a universal joint 69 to a horn bracket 68 fixed to the upper surface of the flap Fp.

The above description concerns the construction of the parts of the high-lift device associated with the port flap Fp, but is applicable also to the parts associated with the startboard flap Fs, which are alike except for their symmetrically opposite arrangement.

The high-lift device of the above described construction operates in the following manner.

The motor M is operated by the pilot of the aircraft to place the flaps in one of the three positions of "UP", "TAKE-OFF", and "LANDING". Ordinarily, the flaps do not stop at positions intermediate between these three positions. When the flaps reach any of these positions, a limit switch within the above mentioned cam box (not shown) operates to stop the motor M. Alternatively, it is also quite possible to use a conventional control system wherein a flap position indicator is additionally installed, and, by manipulating a switch, the pilot stops the flaps at any desired position according to his judgement as he observes the flap position indicator.

Figure 5:
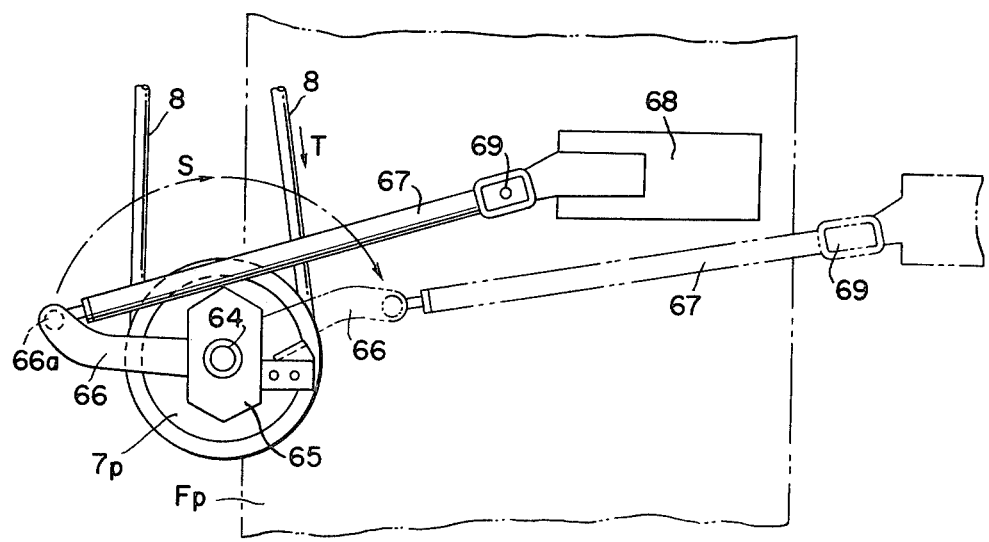

The normal operation of the high-lift device is described above. It will now be assumed, as a supposition, that a failure or defective operation occurs in the torque transmission system to the starboard flap actuator 3s as the flaps are being extended outward from the "UP" position. In this case, the port flap Fp continues to move from the full-line position toward the chain-line position in FIG. 4, but the starboard flap Fs stops moving. Consequently, as a result of the push-pull rod 67 for the port flap Fp tending to move toward chain-line position, the arm 66 is rotated in the arrow direction S as shown in FIG. 5, and the second sheave 7P is also rotated in the same direction, whereby the cable 8 is pulled in the arrow direction T.

This means that the cable 8 is pulled in the arrow direction T in FIG. 2. However, a similar pulling force is not exerted by the starboard flap Fs on that part of the cable 8 at the lower right side as viewed in FIG. 2. Consequently, the swivel frame 10, which is normally in the state shown in FIG. 2 due to the equilibrium between the tensions of the cable 8 on the two sides, is subjected to a moment in the clockwise direction as viewed in FIG. 2 and thus rotates in the same direction. This rotation of the swivel frame 10 causes its forked cam 27 to act on the cam follower 33 of the detection arm 32 thereby to force the detection arm 32 to tilt into the chain-line position.

The detection arm 32 thereby presses against the actuator 38 of the microswitch SW, which thereupon operates to generate a detection signal indicative of the asymmetrical state between the starboard and port flaps. This detection signal can be used for automatically stopping the operation of the high-lift device, or it cam be used to cause an alarm device to operate.

Next, the case wherein a mechanical failure or beakage occurs in the pivot pin 70 by which the starboard flap actuator 3s is supported on the wing, the pin 55 pivotally connecting the nut 54 to the flap Fs, the screw shaft 4s, of like part when both flaps are in the extended position indicated by chain line in DIG. 4 will be considered. In this case, an operation similar to that described above occurs to produce a detection signal indicative of asymmetry, and, at the same time, the air force acting on the starboard flap Fs is resisted in the manner described below thereby to prevent the asymmetrical state from occurring.

In this case, the force of the air acting on the starboard flap Fs tends to urge this flap to move abruptly from the chain-line position in FIG. 4 toward the full-line position. This force, however, is transmitted through the starboard horn bracket 68, push-pull rod 67, arm 66, shaft 64, and the second sheave 7s to the cable 8 and then through the first sheaves 6s and 6p to the second sheave 7p on the port side as a tension load in the cable 8 in the direction opposite the direction T in FIG. 5. As a consequence, the second sheave 7p is exerted a force tending to rotate in the direction (counterclockwise) opposite to the direction S shown in FIG. 5, whereby a tensile force is exerted by the arm 66 on the push-pull rod 67 and is thus transmitted through the horn bracket 68, the flap structure, the pin 55, and the nut 54 to apply a compression force on the screw shaft 4p. In spite of this compression force exerted to the screw shaft 4p, the rotation of the screw shaft is prevented by the irreversibility between the worm 50 and worm wheel 51 and by a irreversible mechanism (not shown) within the flap actuator 3p. As a result, the load on the starboard flap Fs is resisted. In this case, the operation is in the direction completely opposite to that in the case where trouble occurs in the torque transmission system to the starboard flap actuator 3s as consequence of the tensile force produced in the cable 8 by the force of the air acting on the starboard flap Fs, but, by exactly the same action, a detection signal indicative of asymmetry is generated.

Since the reliability of the above described device depends greatly on the reliability of the aforementioned microswitch SW, it is desirable that the pilot of the aircraft check the functioning of this switch from the cockpit prior to a flight. The aforementioned solenoid SOL is provided for this purpose. When the pilot energizes the solenoid SOL from his cockpit through conventional control means (not shown), the armature 41 of the solenoid is thrust out and rotates the lever 39 in the counterclockwise direction thereby to activate the microswitch SW. Thus, a simulated failure state is created. If the motor M stops in response to this state, this will indicate that the microswitch is operative.

As will be apparent from the foregoing disclosure, this invention provides a safety device of simple mechanical parts such as a wire cable and sheaves and a simple arrangement thereof, by which any failure or trouble in the starboard or port flap actuating system can be promptly detected to carry out suitable action, and, at the same time, a dangerously unbalanced condition of the flaps is suppressed. Because of this simple character of this safety device, it does not require any special or additional space, it can be installed together with a conventional high-lift device or additionally installed in an existing high-lift device already installed in an aircraft.

It is to be understood that a great variety of modifications and variations can be made in the safety device of this invention and its installation without departing from the spirit and scope of the invention. For example, a mechanism comprising sprocket wheels and a sprocket chain, a mechanism comprising cranks, levers, and push-pull rods, or a combination of such mechanisms can be used in place of the above described mechanism comprising sheaves and a wire cable.

Furthermore, while this invention has been described above with respect to an example wherein the safety device is applied to slotted flaps of an aircraft, it will be apparent that the use of this safety device is not so limited. For example, the safety device can be readily adapted for application to other high-lift devices such as other types of flaps, leading-edge slats, and lead-edge flaps.

What we claim is:

1. In a high-lift device provided in an aircraft with a main wing and comprising movable starboard and port high-lift surfaces installed with respect to the main wing and driving means for operating the high-lift surfaces synchronously, the combination therewith of a safety device comprising:

a swivel frame pivotally supported at the midpoint thereof by a fixed pivot pin on the aircraft at a position between the starboard and port high-lift surfaces;

first rotation transmitting means comprising a pair of inboard wheel means rotatably supported by respective parallel support shafts on the swivel frame at spaced-apart positions on opposite sides of the fixed pivot pin;

second rotation transmitting means comprising starboard and port units respectively installed in the wing on symmetrically opposite sides of the aircraft in the vicinity of the high-lift surfaces, each unit comprising an outboard wheel rotatably supported by the wing and movement transmitting means for transmitting movements of the corresponding high-lift surface to the outboard wheel thereby to impart rotation to the outboard wheel in accordance with the degree of movement of the high-lift surface;

an endless flexible connector stretched around the outboard wheel means and the inboard wheels in the figure of the Arabic numeral eight, being crossed in the region between the pair of inboard wheel means;

the swivel frame, the first and second rotation transmitting means, and the flexible connected constituting an intercoupling mechanism which operates to mechanically intercouple the starboard and port high-lift surfaces and to synchronize the movements thereof and normally operates in a state of equilibrium wherein the swivel frame is in equilibrium with no moment urging it to swivel when the high-lift device is operating in a symmetrical state, but which continues to intercouple the high-lift surfaces under an unbalanced state therein the swivel frame is biased to undergo a swiveling displacement when the high-lift device operates in an asymmetrical state; and means activated by said swiveling displacement for sensing the asymmetrical state.

2. A safety device in an aircraft high-lift device as claimed in claim 1 in which each of said inboard wheel means comprises two coaxial inboard wheels disposed in tandem so as to enable said flexible connector to be crossed without interference.

3. A safety device in an aircraft high-lift device as claimed in claim 2 in which said inboard and outboard wheels are pulleys or sheaves, and said flexible connector is a steel wire cable.

4. A safety device in an aircraft high-lift device as claimed in claim 2 in which said inboard and outboard wheels are sprocket wheels, and said flexible connector is a chain.

5. A safety device in an aircraft high-lift device as claimed in claim 1 in which said movement transmitting means of each of said units of the second rotation transmitting means comprises a crank arm unitarily rotatable with the outboard wheel of said unit and a link member connecting the outer distal end of the crank and a part of the corresponding high-lift surface.

6. A safety device in an aircraft high-lift device as claimed in claim 1 in which said sensing means is a microswitch activated by said swiveling displacement of the swivel frame.

7. A safety device in an aircraft high-lift device as claimed in claim 1 which is adapted for use in a flap mechanism of an aircraft having starboard and port flaps constituting the starboard and port high-lift surfaces.

* * * * *